May 12, 1936.  F. H. GRIEVE  2,040,126

METHOD OF REGLUING TENON AND MORTISE JOINTS

Filed June 17, 1935

Inventor
Fred H. Grieve
By Fred Gerlach, his Attorney

Patented May 12, 1936

2,040,126

UNITED STATES PATENT OFFICE 2,040,126

METHOD OF REGLUING TENON AND MORTISE JOINTS

Fred H. Grieve, Corning, Calif.

Application June 17, 1935, Serial No. 26,915

3 Claims. (Cl. 144—309)

The present invention relates generally to the regluing of joints. More particularly the invention relates to the regluing of that type of joint which is known as a tenon and mortise joint and is used to secure together in fixed or rigid relation the various wooden parts of chairs, tables, beds and other articles of furniture.

Heretofore it has been customary in the regluing of a tenon and mortise joint to take apart or dismantle the joint by removing or disconnecting the part having the tenon from the part having the mortise and then after applying a coating of glue to the tenon and inserting the tenon back into the mortise permitting the glue to set in order again to join together the two parts in fixed or rigid relation. In practice it has been found that this method because it entails taking apart or dismantling the joint by removing the part having the tenon from the part having the mortise requires considerable time on the part of the person regluing the joint and is often difficult to carry out especially in instances where the parts which are joined together by the joint are fixedly connected to other parts and cannot be readily removed or disconnected one from the other.

The primary object of the present invention is to provide a method of regluing tenon and mortise joints which may be carried out more rapidly and with less difficulty than the method heretofore employed by reason of the fact that it contemplates no removal or disconnection of the part having the tenon from the part having the mortise. In general the improved method consists in first forming by a drill or nail a small hole in the portion of the tenon within the mortise and then forcing glue through the hole so that it flows into all loose portions of the joint.

Another object of the invention is to provide a method of regluing tenon and mortise joints which is extremely simple and may be carried out merely by the use of a small drill or nail and a glue-filled pressure gun.

Other objects of the invention and the various advantages and characteristics of the present method of regluing tenon and mortise joints will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
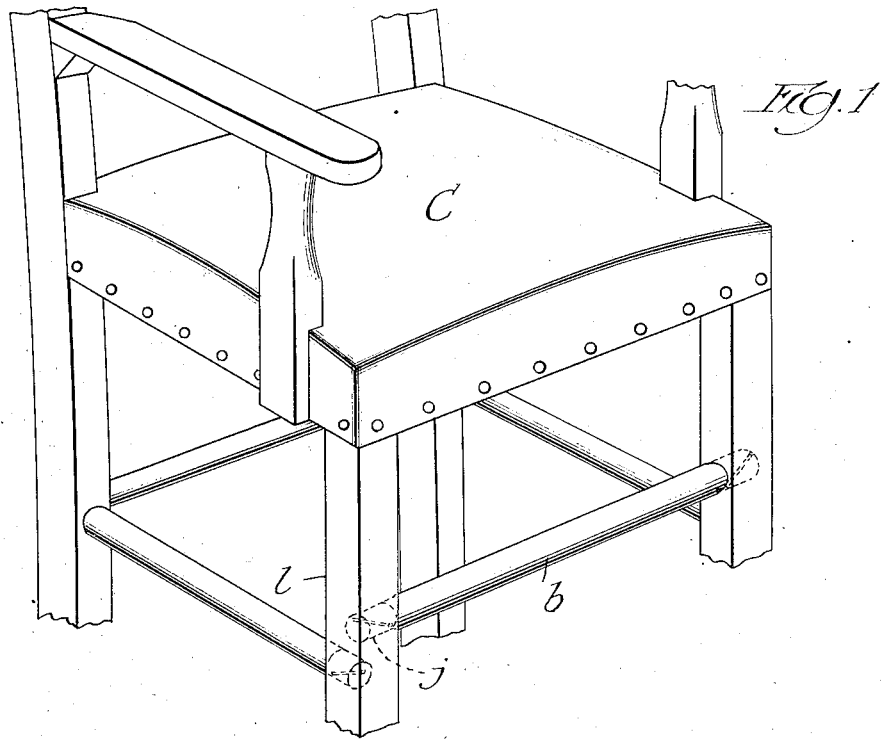
Figure 1 is a fragmentary perspective of a chair having between one of the front legs thereof and the front cross-brace a tenon and mortise joint reglued in accordance with the present method.
Figure 2:
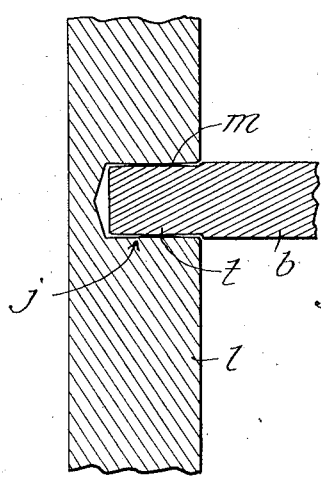
Figure 2 is a sectional view showing the joint of the chair of Figure 1 before being reglued.

The method which forms the subject matter of the invention contemplates or has reference to the regluing of a tenon and mortise joint such for example as that which is shown in the drawing and is designated by the reference character or letter $j$. This joint $j$ consists of a tenon $t$ and a mortise $m$ and serves as a medium for holding in rigid or fixed relation one of the front legs $l$ of a chair C and the front cross-brace $b$ of the chair. As shown in Figure 1 of the drawing, the tenon $t$ of the joint is formed at one end of the front cross-brace $b$ and is cylindrical in conformation and the mortise $m$ is in the form of a cylindrical socket which corresponds in diameter to the tenon and is formed in the leg $l$ of the chair C.

Figure 3:
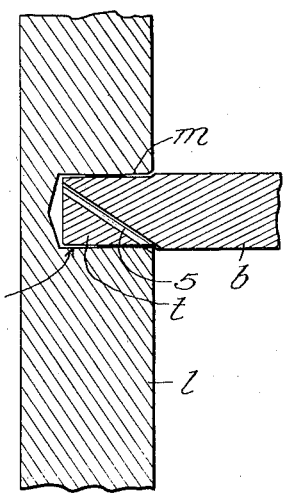
Figure 3 is a corresponding or like sectional view showing the joint after drilling of the glue hole in the tenon.

The improved method of regluing the joint includes as the first step thereof forming a comparatively small hole 5 in the tenon. This hole 5 may be made by a drill or a small nail and is preferably formed so that it extends diagonally through the tenon from a point at the base of the tenon directly opposite the outer end of the mortise to a point in the end face of the tenon (see Figure 3).

Figure 4:
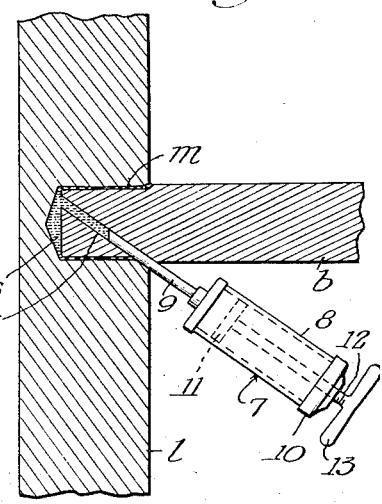
Figure 4 is a sectional view showing the manner in which the glue is injected or forced under pressure through the hole into the mortise in order to fill the loose parts of the joint and complete the regluing operation.

The second or final step of the method consists in forcing a charge 6 of glue so that it passes through the hole 5 and flows between the tenon and mortise and into all loose portions of the joint. The charge 6 is preferably introduced or injected into the hole 5 by way of a pressure gun 7. The latter, as shown in the drawing, consists of a barrel 8 having a small nozzle 9 at one end thereof. The other end of the barrel has a removable cap 10 which carries a piston 11 with an externally threaded stem 12. The stem extends through an internally threaded hole in the cap 10 and has at its outer end a handle 13 for turning purposes. Glue is introduced into the gun by removing the cap and piston from the barrel 8. When the cap is again applied to the barrel and the handle 13 is turned so as to force the piston 11 towards the nozzle 9 the glue within the barrel is forced under pressure out through the nozzle 9. After the hole is drilled or otherwise formed in the tenon the nozzle 9 is inserted into the outer end of the hole, as shown in Figure 4, and the gun is thereafter manipulated until the desired amount of glue is forced into the mortise in order to fill all of the loose portions of the joint $j$. In practice it has been found that a hole having a diameter of approximately one-sixteenth of an inch forms an efficient passageway for flowing the glue through the tenon into the mortise. By reason of the fact that the glue for regluing is introduced into the loose portions of the joint while the tenon is in the mortise it is not necessary to dismantle the joint and the regluing operation may be carried out quickly and at an extremely low cost.

The herein described method of regluing a mortise and tenon joint is not only simple but eliminates all unnecessary labor and as previously pointed out may be carried out in an exceptionally short time. After the second step of the method is carried out, that is after the injection of the charge 6 of glue into the loose portions of the joint, the glue is permitted to set or harden.

The invention is not to be understood as restricted to the details set forth, since these may be modified within the scope of the appended claims, without departing from the spirit and scope of the invention.

Having thus described the invention, what I claim as new and desire to secure by Letters Patent is:

1. That improvement in regluing a joint made up of tenon and mortise members which comprises first forming in one of the members a hole leading to the inner end of the mortise and then directing glue under pressure through the hole into the space between the tenon and the mortise.

2. That improvement in regluing a tenon and mortise joint which comprises first forming in the tenon a hole leading from the base of the tenon to a point at the inner end of the tenon where it communicates with the mortise, and then directing glue under pressure through the hole into the space between the tenon and the mortise.

3. That improvement in regluing a tenon and mortise joint which comprises first drilling in the tenon a diagonal hole extending from the base of the tenon to the inner end of the tenon and then forcing glue through the hole into the space between the tenon and the mortise.

FRED H. GRIEVE.